(No Model.) 2 Sheets—Sheet 1.

J. E. BOLES & A. WILSON.
BAND CUTTER AND FEEDER.

No. 495,010. Patented Apr. 11, 1893.

Witnesses

Inventors
J. E. Boles
A. Wilson

Attorney

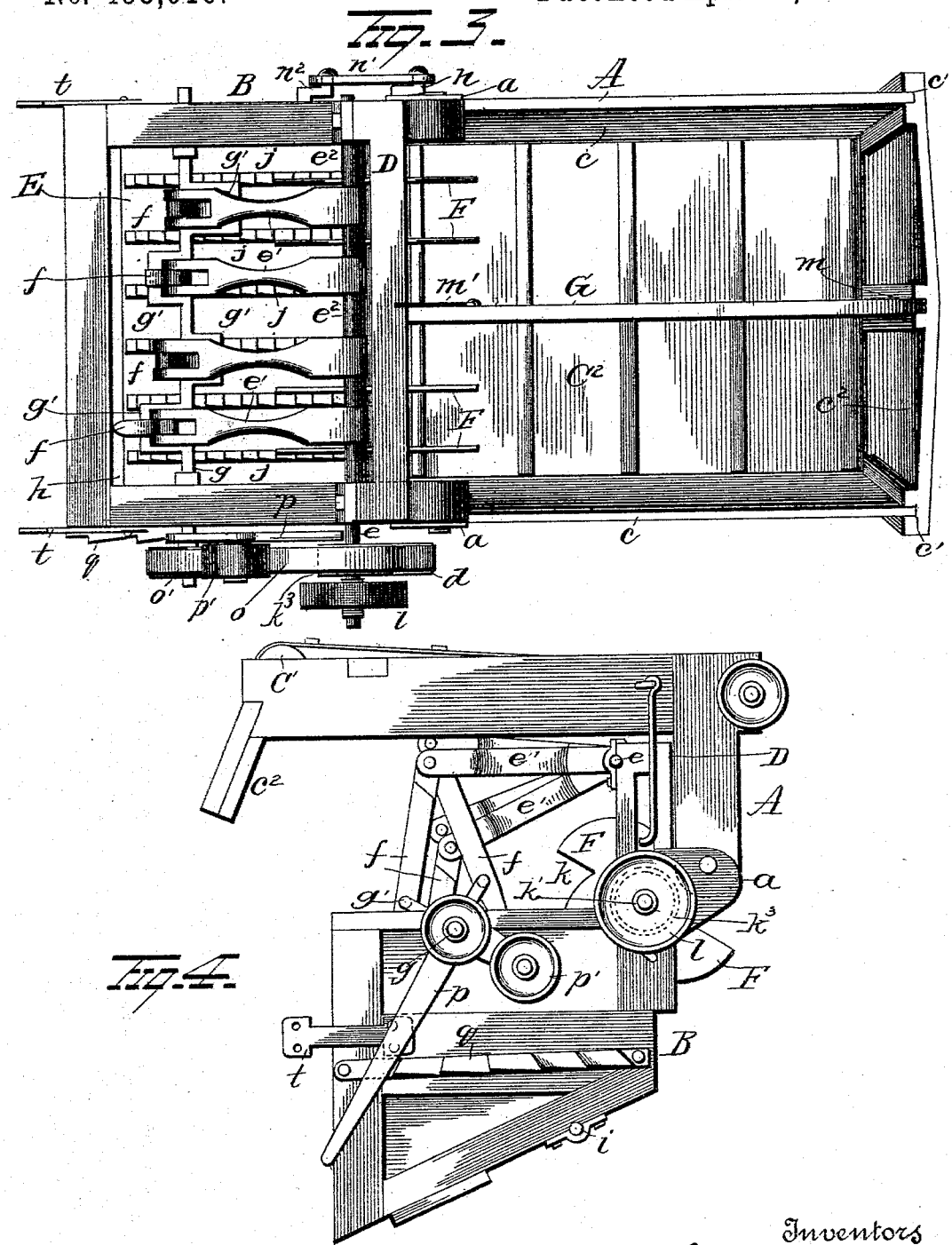

UNITED STATES PATENT OFFICE.

JACOB E. BOLES AND ALFRED WILSON, OF ALTA, IOWA; SAID WILSON ASSIGNOR TO SAID BOLES.

BAND-CUTTER AND FEEDER.

SPECIFICATION forming part of Letters Patent No. 495,010, dated April 11, 1893.

Application filed April 9, 1892. Serial No. 428,462. (No model.)

*To all whom it may concern:*

Be it known that we, JACOB E. BOLES and ALFRED WILSON, of Alta, in the county of Buena Vista and State of Iowa, have invented certain new and useful Improvements in Band-Cutters and Feeders; and we do hereby declare the following to be a full, clear, and exact description of the invention, such as will enable others skilled in the art to which it appertains to make and use the same.

Our invention relates to an improvement in band cutters and feeders for thrashing machines,—its object being to construct a machine of the description specified in such manner that the bands which bind the bundles of grain will be effectively cut at the proper time and the grain fed to the thrashing machine in such manner as to decrease the amount of power necessary to run the separator or thrasher.

A further object is to so construct the machine that it can be easily and quickly adjusted for operating different kinds and conditions of grain.

A further object is to construct a band cutter and feeder in such manner that it may be folded into compact form for transportation.

A further object is to produce a band cutter and feeder which shall be comparatively simple in construction and effectual in the performance of its functions.

With these objects in view the invention consists in certain novel features of construction and combinations and arrangements of parts as hereinafter set forth and pointed out in the claims.

Figure 1:
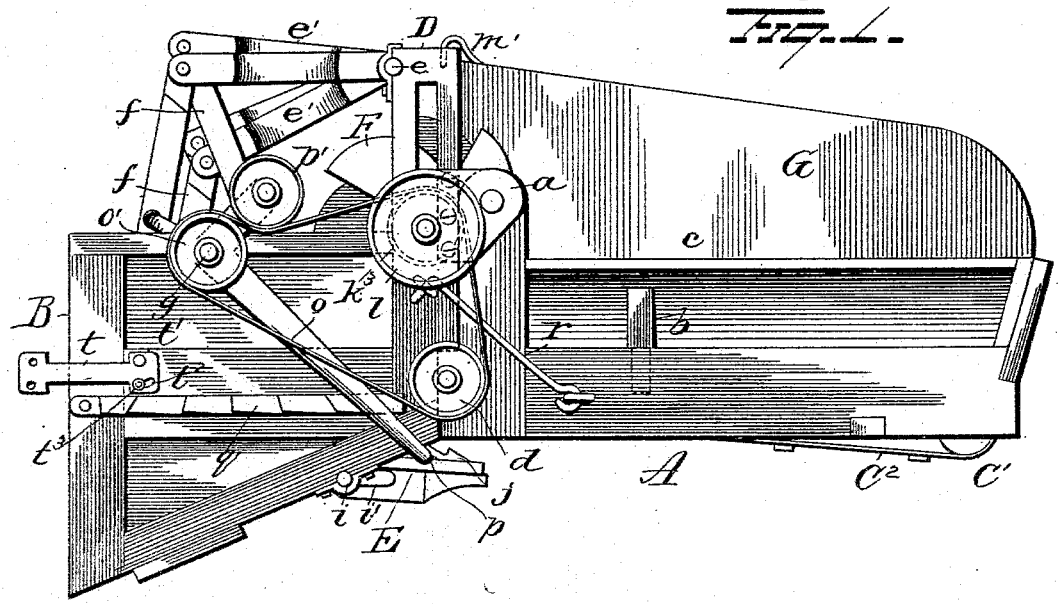
Figure 2:
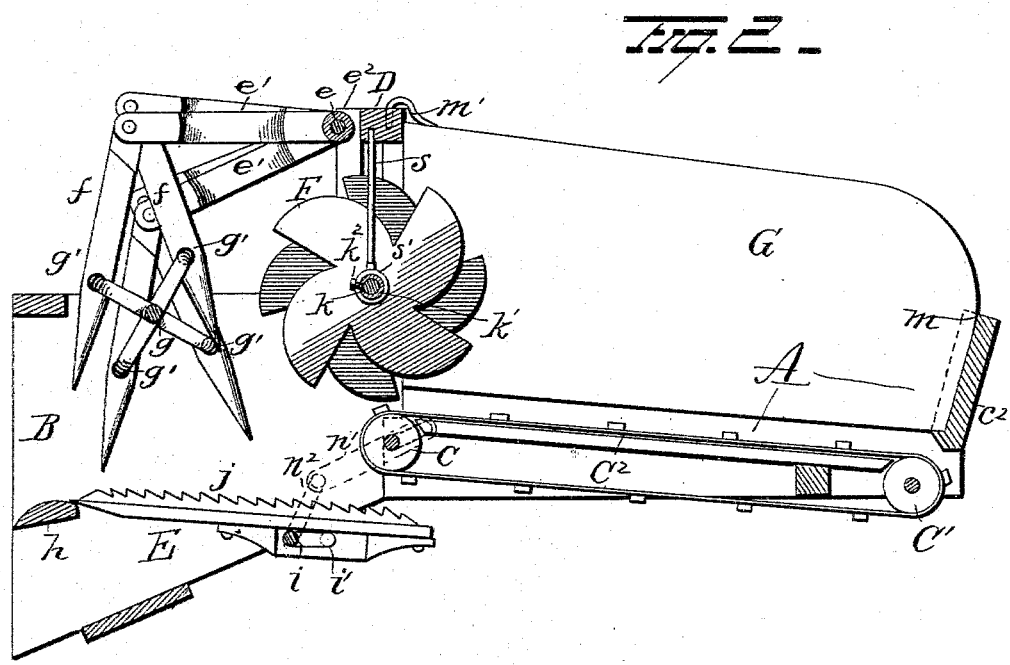

In the accompanying drawings: Figure 1 is a side elevation. Fig. 2 is a longitudinal sectional view. Fig. 3 is a top plan view. Fig. 4 is a view of the device folded for transportation.

A, B, represent two frames, hinged together by means of straps or hinges $a$. The sides of the frame A, are provided with sockets for the reception of socket pieces $b$ secured to the inclined side boards $c$,—said side boards, at their rear ends, entering ways $c'$ in the inclined end or tail board $c^2$. In each end of the frame A, rollers C, C' are mounted, over which an endless conveyer $C^2$ passes, the roller C being provided at one end with a pulley $d$. A bracket D extends upwardly from the rear end of the frame B, and in the upper end of this bracket a shaft $e$ is mounted. Loosely mounted on the shaft $e$ is a series of arms $e'$, properly spaced apart by means of collars or sleeves $e^2$. The forward ends of the arms $e'$ are bifurcated for the reception of the upper ends of a series of pickers $f$, pivotally connected to said arms. Mounted in the frame B, beneath the forward ends of the arms $e$, is a crank shaft $g$ having a series of crank arms $g'$, connected with the pickers $f$,—said crank arms being so arranged that when the crank shaft is revolved, the pickers $f$ will be vibrated irregularly.

Mounted in the forward end of the frame B is a cross bar $h$, on which the forward edge of a feed board E normally rests, said feed board being also supported by a crank shaft $i$ mounted in the frame B. The feed board is provided with a series of toothed or serrated bars $j$ and is disposed in an inclined position, the inclination of said feed-board being about eight inches. The feed board E is connected on its under side, with the crank $i'$ of the crank shaft $i$, and thus has an endwise vibratory motion imparted to it when the crank shaft $i$ is oscillated as hereinafter described.

Mounted in the bracket D at a point near the frame B is a shaft $k$, on which a sleeve $k'$ is loosely mounted, said sleeve connected with the shaft $k$ and made to rotate therewith by means of a set screw $k^2$. A series of cutters F is secured to the sleeve $k'$ and is adapted to cut the bands which bind the grain. The shaft $k$ is provided with a pulley $k^3$ and a pulley $l$, one preferably larger than the other. A strap passes over one of said pulleys from any suitable motor, whereby motion will be imparted to the cutters. A center board G will be located between the sides of the frame A,—one end of said center board being inserted in a way $m$ on the tail board $c^2$ and connected at its other end with the bracket D by means of a hook $m'$. Connected with one end of the roller C is a crank arm $n$ which is connected by a link $n'$ with a crank arm $n^2$ on one end of the crank shaft $i$, whereby an oscillatory movement will be imparted to the crank shaft $i$ during the rotation of the roller C, and thus vibrate the feed board E as above explained. A strap is passed over the pulley $l$ from any suitable source of power as above explained, and another strap $o$ is passed over the pulley $d$ on the end of the roller C, the pulley $k^3$, on the shaft of the cutter and over a pulley $o'$ carried by the crank shaft $g$. The pulleys $l$ and $k^3$ are preferably secured to the shaft $k$ by means of set screws and may be transposed when it is desired to change the speed of the machine.

Mounted on the shaft $g$ is an L-shaped arm $p$, at the end of the short arm of which a pulley or wheel $p'$, is mounted and adapted to bear on the top of the strap or belt $o$. By this means a simple and effective belt tightener will be provided, the arm or lever $p$ being adapted to be retained in a fixed position relatively to the strap, by its engagement with a rack bar $q$ secured to the frame B.

By providing a feed board adapted to have an endwise vibration and disposed in an inclined position, the heads of the grain will be lowered just previous to the insertion of the grain into the cylinder of the thrasher.

The frames A, B, will be maintained in a fixed position relatively to each other during the operation of the machine by means of hooks $r$.

From the construction and arrangement of the machine as above set forth, it will be seen that by removing the side boards $c$, and center board G, and unlocking the hooks $r$, the frame B may be folded upon the frame A, when it is desired to transport the machine.

When it is desired to pass flax through the machine, the set screw $k^2$ will be loosened so as to prevent the rotation of the knives.

In order to provide means for automatically and continuously cleaning the knives or cutters, a series of rods $s$ is connected at their upper ends to the cross bar of the bracket D and, projecting downwardly in close proximity to the faces of the cutters F, are connected at their lower ends to loose sleeves $s'$, mounted on the sleeve $k'$.

By the arrangement of the pickers above described, and the co-operation of the feed board, the grain will be effectually fed to the thrashing machine, and wet grain will be properly separated before its entrance to the thrashing machine.

The device can be attached to a thrashing machine by means of plates $t$, said plates being pivotally connected to the frame B at $t'$, and provided with elongated slots $t^2$ for the reception of pins $t^3$.

Having fully described our invention, what we claim as new, and desire to secure by Letters Patent, is—

1. The combination with rotary cutters, of cleaning rods located in close proximity to the faces thereof, said rods extending from the support of the cutters to some rigid part of the machine substantially as set forth.

2. In combination with a band cutter and feeder, the combination with a series of rotary cutters and a shaft for carrying said rotary cutters, of a series of depending cleaning rods, one in close proximity to each face of each cutter, and sleeves loosely mounted on said shaft, to which sleeves the cleaning rods are secured, substantially as set forth.

3. The combination with a frame, of a shaft revolubly supported, a sleeve held on the shaft and having secured thereto a series of cutters, short sleeves in which the cutter carrying sleeve rotates, and cleaners extending from the short sleeves on each side of the cutters to the frame, substantially as set forth.

In testimony whereof we have signed this specification in the presence of two subscribing witnesses.

JACOB E. BOLES.
ALFRED WILSON.

Witnesses:
J. W. BARD,
W. L. WILCOX.